United States Patent [19]
Chang

[11] Patent Number: 5,590,339
[45] Date of Patent: Dec. 31, 1996

[54] INPUT DEVICE INTERFACE WITH POWER CONNECT STATE AND SERIAL DATA CHANNEL ENABLING POWER TO THE DEVICE FROM TIME TO TIME

[75] Inventor: Hershow Chang, Hsin-Chu, Taiwan

[73] Assignee: Macronix International Co., Ltd., Hsinchu, Taiwan

[21] Appl. No.: 110,533

[22] Filed: Aug. 23, 1993

[51] Int. Cl.⁶ ........................................ G06F 1/32
[52] U.S. Cl. .................... 395/750; 395/838; 358/442; 379/100
[58] Field of Search .................... 379/100; 358/442; 395/750, 835, 838

[56] References Cited

U.S. PATENT DOCUMENTS

| | | | |
|---|---|---|---|
| 3,771,135 | 11/1973 | Huettner et al. | 395/275 |
| 4,512,026 | 4/1985 | Vander Meiden | 375/114 |
| 4,517,590 | 5/1985 | Nagashima et al. | 358/75 |
| 4,641,263 | 2/1987 | Perlman et al. | 395/275 |
| 4,652,933 | 3/1987 | Koshiishi | 358/256 |
| 4,802,204 | 1/1989 | Chang | 379/100 |
| 4,841,440 | 6/1989 | Yonezu et al. | 395/750 |
| 4,964,154 | 10/1990 | Shimotono | 379/100 |
| 4,991,200 | 2/1991 | Lin | 379/100 |
| 5,003,578 | 3/1991 | Lin | 379/90 |
| 5,008,760 | 4/1991 | Shimizu et al. | 358/451 |
| 5,021,892 | 6/1991 | Kita et al. | 358/468 |
| 5,163,124 | 11/1992 | Yabe et al. | 395/750 |
| 5,164,822 | 11/1992 | Muramatsu | 358/75 |
| 5,191,603 | 3/1993 | Kafri | 379/98 |
| 5,289,465 | 2/1994 | Mouro et al. | 370/82 |
| 5,303,067 | 4/1994 | Kang et al. | 358/442 |
| 5,323,450 | 6/1994 | Goldhagen et al. | 379/100 |
| 5,404,459 | 4/1995 | Gulick et al. | 395/275 |
| 5,408,668 | 4/1995 | Tornai | 395/750 |

*Primary Examiner*—Thomas C. Lee
*Assistant Examiner*—D. Dinh
*Attorney, Agent, or Firm*—Wilson, Sonsini, Goodrich & Rosati

[57] ABSTRACT

An interface for connecting a local input device to a host, such as a telephone message receiving unit. The interface transfers data serially from the local input device to the telephone message receiving unit for print out or facsimile transmission thereby. Control of the interface is governed by a state machine having several states.

18 Claims, 10 Drawing Sheets

FIG.−1

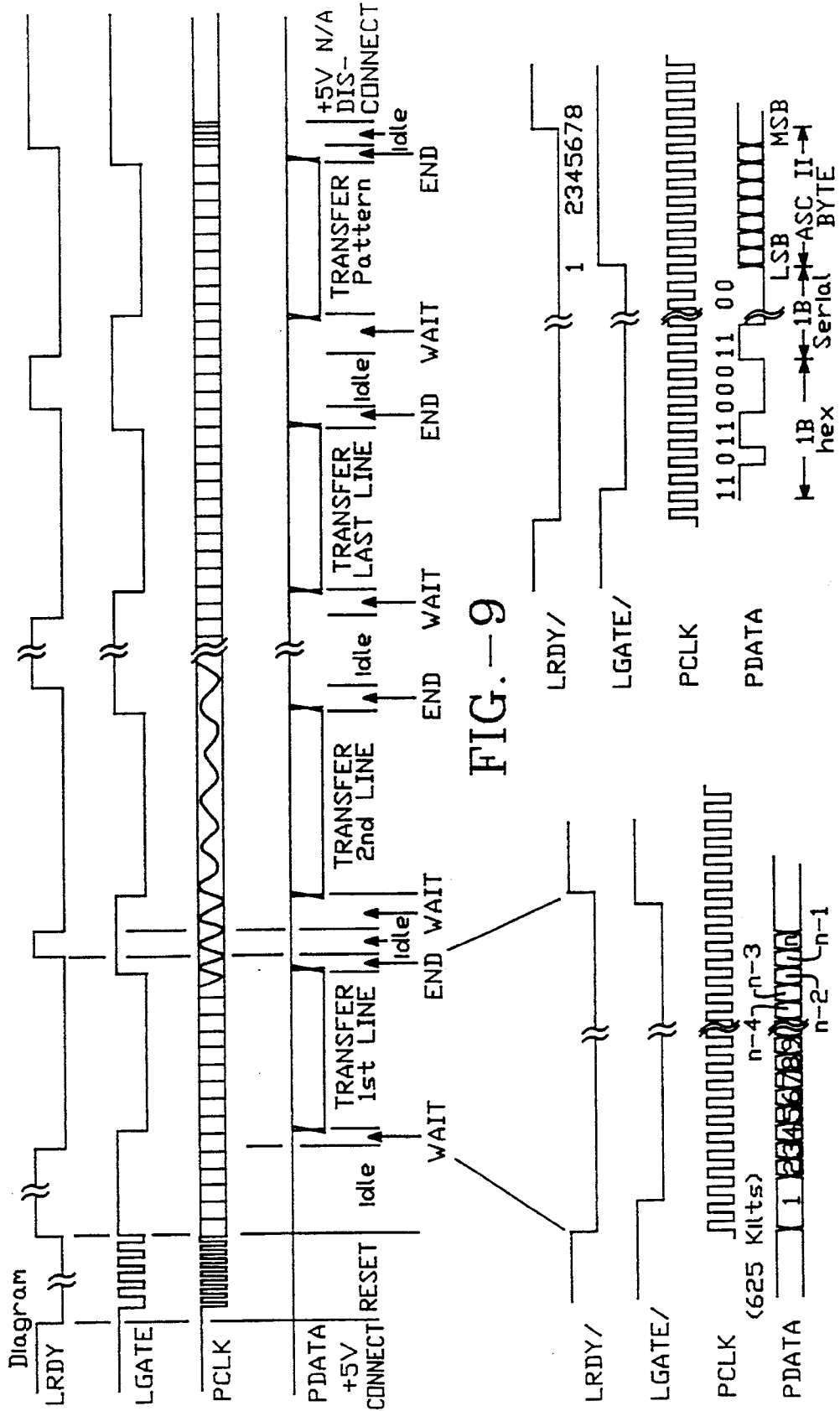

5,590,339

INPUT DEVICE INTERFACE WITH POWER CONNECT STATE AND SERIAL DATA CHANNEL ENABLING POWER TO THE DEVICE FROM TIME TO TIME

CROSS REFERENCE TO RELATED APPLICATIONS

The present application is related to U.S. patent application Ser. No. 08/110,545, filed on the same day as the present application, entitled HARD COPY MESSAGE APPARATUS, invented by Hershow Chang, now abandoned.

BACKGROUND OF THE INVENTION

1. Technical Field

The present invention relates to a simplified input device interface for transmitting data from a local input device to a hard copy telephone message receiving unit for print out or for facsimile transmission by the unit.

2. Description of the Related Art

Telephone answering machines and facsimile machines are the result of advances in electronic and telephonic technologies. Recently products have become available which merge into a single unit, a telephone, a telephone answering machine and a facsimile machine. A characteristic aspect of these combination products, in addition to the fact that they are expensive and bulky, is that they do not permit the input of data from a local input device, such as a scanner, a tablet or a computer, which could take advantage of the hard copy printer and facsimile transmission capabilities of these combination products.

Thus, a need exists for an interface which permits the input of data from a local input device to a telephone message receiving unit to obtain access to the hard copy and facsimile transmission capabilities thereof.

SUMMARY OF THE INVENTION

The present invention overcomes the problems and shortcomings of the prior art by providing a simplified input device interface controlled by a state machine. The interface, in one embodiment, has six signal lines which are power, ground, data, clock, control signal transmit and control signal receive. Note that the data line is a singular line for black and white data transmissions and consists of multiple signal lines, such as four in one embodiment, for color data transmissions. Propagation of signals over these lines functions in accordance with control logic driven by the state machine.

The state machine preferably has seven states: disconnect, connect, reset, idle, wait, transfer, and end. During the disconnect state, the six signal lines are tri-stared. One significant aspect of this is that the power supply line which propagates power from a power supply to an input device, is not enabled. Power is not supplied during the disconnect state, but is supplied during all of the other states.

In response to the activation of a transmit switch which in turn sets a start bit in a status register and indicates that a user desires to transfer data from an input device to a telephone message receiving unit, the connect state is entered. During the connect state, a determination is made as to whether an input device is connected at the interface. Affirmation that an input device does exist is provided by the input device over the control signal receiving line in response to the enabling of power on the power line.

If an input device is present, the reset state is entered in which a reset signal is sent from the control logic to an input device. This state ends when the input device indicates that reset is complete.

The reset state is followed by the idle state. During the idle state, control logic generates a signal on the control signal receiving line that a line of data is ready for transfer. Note that if, in the reset state, an end of transmission (EOT) command is sent by an input device, the CPU will clear the start bit in the status register and control returns to the disconnect state.

When the input device indicates via the control signal receiving line that a line of data is ready for transfer, the wait state is entered. The wait state continues until the control logic indicates that it is ready to receive a line of data by propagating a signal indicating same over the control signal transmit line.

After the ready to receive signal is propagated, the transfer state is entered in which data is transferred from an input device to the host to which the control logic is coupled. The transferred data may be either image data or command data. In the case that it is image data, it is transferred one bit per cycle of the data clock propagated on the clock line and it is propagated in predetermined lengths; for example, for the transfer of one line of data for facsimile transmission having a length of 215 mm ±1%, 1728 bits of data are transferred. Note generally that data transfers for the interface described herein are governed by CCITT standards and recommendations for facsimile data transmission, particularly those pertaining to Group B.

When it is desired to transmit command data, the predetermined length of data in an image data line is replaced with a predefined sequence which has a length equal to the predetermined length. The command data follows the predefined sequence. In one embodiment, eight bits of command data which form a "command byte" are provided after the predefined sequence.

The end state follows the transfer state. In the end state, the control signal receiving line is monitored to receive a signal from an input device that it has completed transfer of a line of data. If command data has been transmitted, the command data is decoded and control is transferred to the idle state.

If an EOT signal is decoded, control is transferred from the idle state to the disconnect state.

In addition, the control signal receiving line is monitored to determine if another valid line of data is ready for transfer from the input device. If a signal indicating this is timely received, control is transferred back to idle state where transfer of the next valid line of data follows therefrom as discussed above. If an indication that the next line of valid data is ready for transfer is not timely received, a time-out is declared and control passes back to the disconnect state.

There are several time-out features provided within the state machine to ensure that the interface is not hung-up by the occurrence of an error in the transmission process. For example, if during the connect state an indication that an input device is present is not timely received, control returns to the disconnect state. If, in the idle state, an indication that the input device has a valid line of data for transfer is not timely received, control returns to the disconnect state. If in the wait state or in the end state, an indication that the control logic is ready to receive data is not timely generated, a time-out is declared and transfer is returned to the disconnect state. And further in the transfer state, if a signal is detected on the control signal receiving line that the data transfer operation has detected an error or has been interrupted, control is returned to the disconnect state.

Since the interface device provides a separate data ready and request to send data for each line of data transferred from an input device, the input device need not operate synchronously with a host between the transfer of lines of data. This permits uncorrupted data transmission between an input device that operates at a frequency slower than the host.

Furthermore, the number of data bits which form a line of data is set by the control logic and may be modified to accommodate different types of data transmission. For example, as described above for a facsimile transmission, the number of bits per line of data is 1728. This number may be modified to accommodate different applications.

These and related features of the present invention will be more apparent upon review of the following detailed description considered with reference to the figures.

BRIEF DESCRIPTION OF THE DRAWINGS

FIG. 9 is a timing diagram for data transmission from an input device to a PMD.

FIG. 10 is a timing diagram for the transfer of one line of image data from an input device to a PMD.

FIG. 11 is a timing diagram for the transfer of one line of command data from an input device to a PMD.

DETAILED DESCRIPTION

Figure 1:
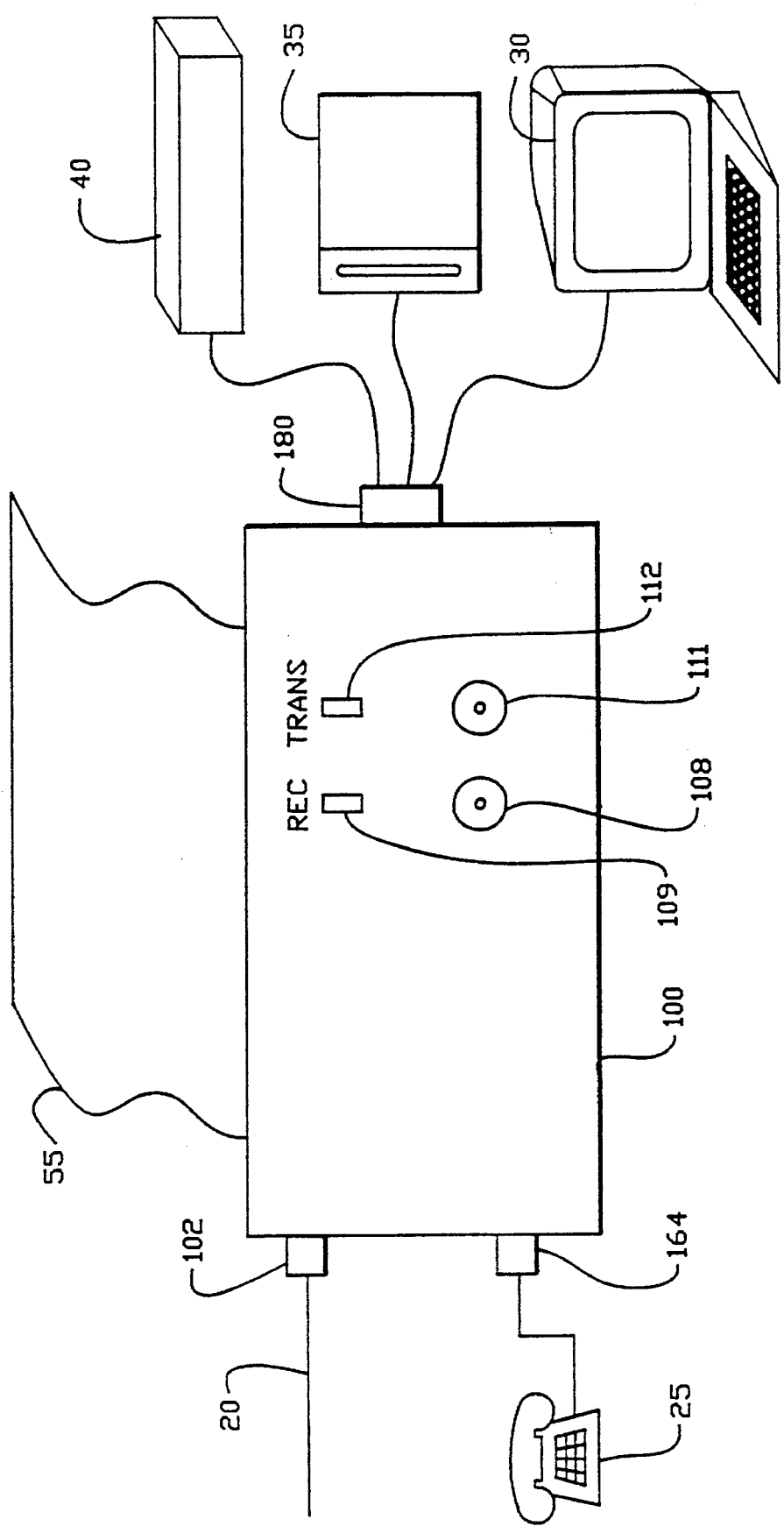
FIG. 1 is a diagram of the personal message device of the present invention illustrating the connection of various components thereto.

Referring to FIG. 1, a personal message device (PMD) 100 having an intelligent interface 200 is shown. The PMD 100 is connected to a telephone line 20 which is normally a public switch telephone network (PSTN) communication line and a telephone 25. The telephone line 20 is connected through a port 102 such as an RJ11 connector port which meets PSTN requirements, or the like, and the telephone 25 is connected through a standard telephone interconnect port 104. As will be discussed in more detail below, the PMD 100 provides a reception of facsimile transmissions and electrical data entered by a human caller via a telephone keypad. Both the electronic image data of a facsimile transmission and the electronic data entered through a keypad may be printed out by a hard copy printer (described below) onto paper 55 which is output from the PMD 100.

The PMD 100 includes a receive and transmit LED 109 and 112 which indicates received mode and transmission mode operation, respectively. A receive switch 108 and a transmit switch 111 are also provided. Selection of one of these switches places the PMD 100 in the mode selected.

The PMD 100 also provides an input port 180 for the input of data to be printed out on the hard copy printer 168 or for transmission as a facsimile transmission onto line 20. An input device interface is used for the transmission of data between an input device 30, 35, 40 and the input port 180 of the PMD 100. This interface is described in more detail below with reference to FIGS. 5–12. Examples of input devices which may be used to input data to the PMD 100 include a computer 30, a tablet 35 and a scanner 40.

Figure 2:
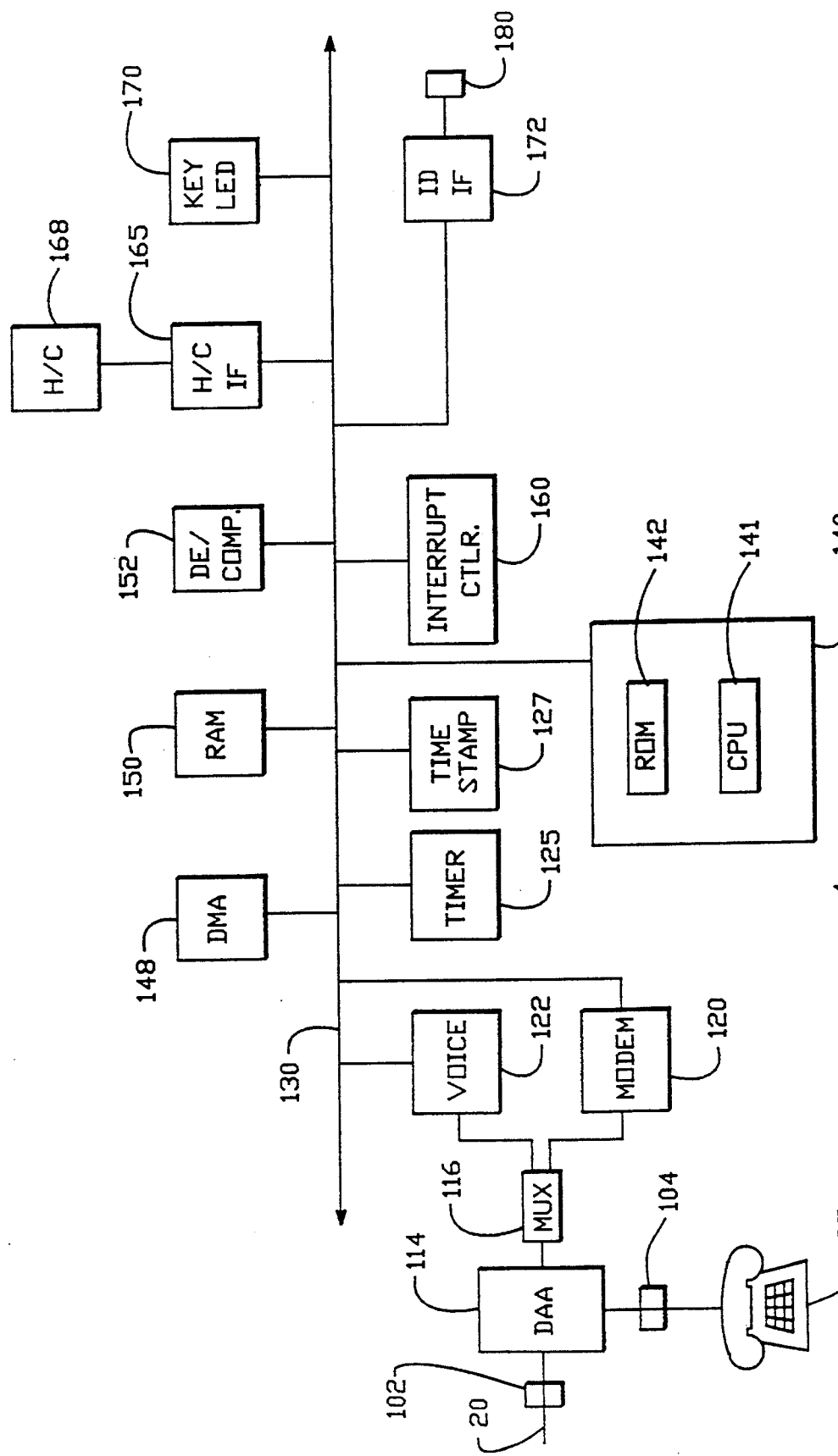
FIG. 2 is a block diagram of circuitry within a personal message device.

Referring to FIG. 2, a block diagram illustrating circuitry internal to the PMD 100 is shown. The circuitry includes a processor 140 which includes a central processing unit 141, ROM 142 and a plurality of registers (not shown) in addition to other circuitry known in the art. The processor 140 is connected to a system local bus 130 to which are connected a plurality of electronic components which perform dedicated functions. In the arrangement of FIG. 2, the majority of these components are represented by blocks connected to the system bus 130. In actual design, this may or may not be the case. It is known that several of the features represented as blocks in FIG. 2 and discussed below may be performed in either hardware or software. The present invention is intended to cover either embodiment. For example, compression and decompression of data into or out of facsimile format may be done by hardware dedicated to this function or may be done entirely by software utilizing the processor 140. Furthermore, compression and decompression may be performed partially in software or partially in hardware. Furthermore, it is also important to note that the individual components which make up the PMD 100 may be provided as individual chips or fabricated as a single integrated circuit or as a chip set having a reduced number of integrated circuits. The PMD 100 is described herein below substantially as it is illustrated in FIG. 2. Where appropriate, however, exceptions with respect to implementation in hardware or software or the option of including or excluding the function of a specific blocks is discussed.

The telephone line 20 and telephone 25 are connected to a data access arrangement (DAA) 114. The DAA 114 is a known circuit for interfacing to the PSTN and contains equipment to prevent damage to the PSTN. The DAA 114 is bidirectionally connected to a multiplexer 116 which is bidirectionally connected to a modem 120 and unidirectionally connected to a voice generator 122. Both the modem 120 and the voice generator 122 are connected to the system local bus 130. The multiplexer 116 is provided to select between an outgoing signal from the voice generator 122 or outgoing transmission data from the modem 120. The select lines of the multiplexer 116 are controlled by the CPU 141. The voice generator 122 when enabled, produces an electrical signal which is converted to an audio signal that is transmitted through the DAA 114 over a telephone line 20 to the calling party. The audio signal is converted into a message to the calling party, instructing the calling party to select a predefined key on the caller's telephone keypad, such as the star (*) key, if the caller wants to place the PMD 100 in a facsimile reception mode. The outgoing message also requests the caller to compose his or her telephone number by depressing the appropriate keys on the keypad of the caller's telephone, followed by pressing a predefined key, such as the pound (#) key.

In the reception mode, all data transmitted through the DAA 114 is transmitted to the modem 120. Modem 120 is a Group III facsimile transmission and reception modem, or the like. As such, the modem 120 is capable of determining whether the incoming call is from a remote facsimile machine or by default from a calling party. The determination of whether an incoming signal is from a remote facsimile machine is achieved by detecting a CNG signal which has a frequency of 1100 Hz and a duration of 500 milliseconds and is a standard facsimile identification signal. If a CNG signal is detected, modem 120 instructs the processor 140 to enter facsimile transmission reception mode, wherein the reception LED 109 is turned on and incoming electronic image data from the facsimile transmission is propagated in and out of RAM 150 and through the hard copy interface 165 to the hard copy printer 168 where it is printed out onto the paper 55 (shown in FIG. 1).

A timer 125 is also connected to the system bus 130. The timer 125 is a watch dog timer that generates time-out signals in order to keep the PMD 100 from locking up during operation. Time-out counts are programmable and may be set by the processor 140. The timer 125 is available commercially. A time stamp circuit (or real time clock) 127 is provided in the PMD 100 for updating year, month, day, hour, minute and second information for use in time stamping incoming messages and facsimiles and for general system management purposes. Time stamp circuitry is generally known in the art.

DMA block 148 represents DMA channel capabilities. Though the use of DMA channels in the PMD 100 is optional, performance is enhanced by providing a DMA channel between the RAM 150 and hard copy printer 168. Performance is further enhanced by providing a second DMA channel between the input device interface 172, connected to input port 180, and RAM 150 for transmission of input data into the PMD 100.

The RAM 150 is standard random access memory. This memory 150 is partitioned virtually to areas which accommodate incoming data, such as, an incoming facsimile transmission which must be decompressed before printout at printer 168, or outgoing data input from an input device which must be compressed or otherwise processed before transmission through modem 120 on to telephone line 20. The RAM 150 also contains portions which are dedicated for use by the processor 140.

The compression and decompression block 152 represents componentry to carry out compression and decompression. As mentioned above, this may be done either in hardware or software. A preferred hardware implementation is to use a commercially available circuit to implement CCITT specified T.4 image data compression and decompression.

An interrupt controller 160 is also provided in communication with the local system bus 130. The interrupt controller 160 controls access between the processor 140 and the timer circuit 125, the DMA channel(s) 148, the key and LED circuit 170 and the compression and decompression circuit 152 through interrupts to the CPU 141.

A printer interface 165 is provided for interfacing between the processor 140 and the printer 168. Specifics of the interface 165 depend on the type of printer device 168 being used and are generally known in the art. The hard copy printer device 168 may be a thermal transfer printing head, an ink printing head, a dot matrix printing head, a laser printing mechanism, an LCD transfer printing mechanism, or the like, depending on a particular need or application.

The key and LED circuit 170 is connected to the local system bus 130 and transmits information bidirectionally between both the LEDs 109, 112 and switches 108, 111 and the processor 140.

An input device interface 172 is also provided. This interface, which is described in more detail below with reference to the intelligent interface 200, is provided for inputting data from an external input device to the PMD 100. The input device interface 172 is connected to input port 180.

Figure 3:
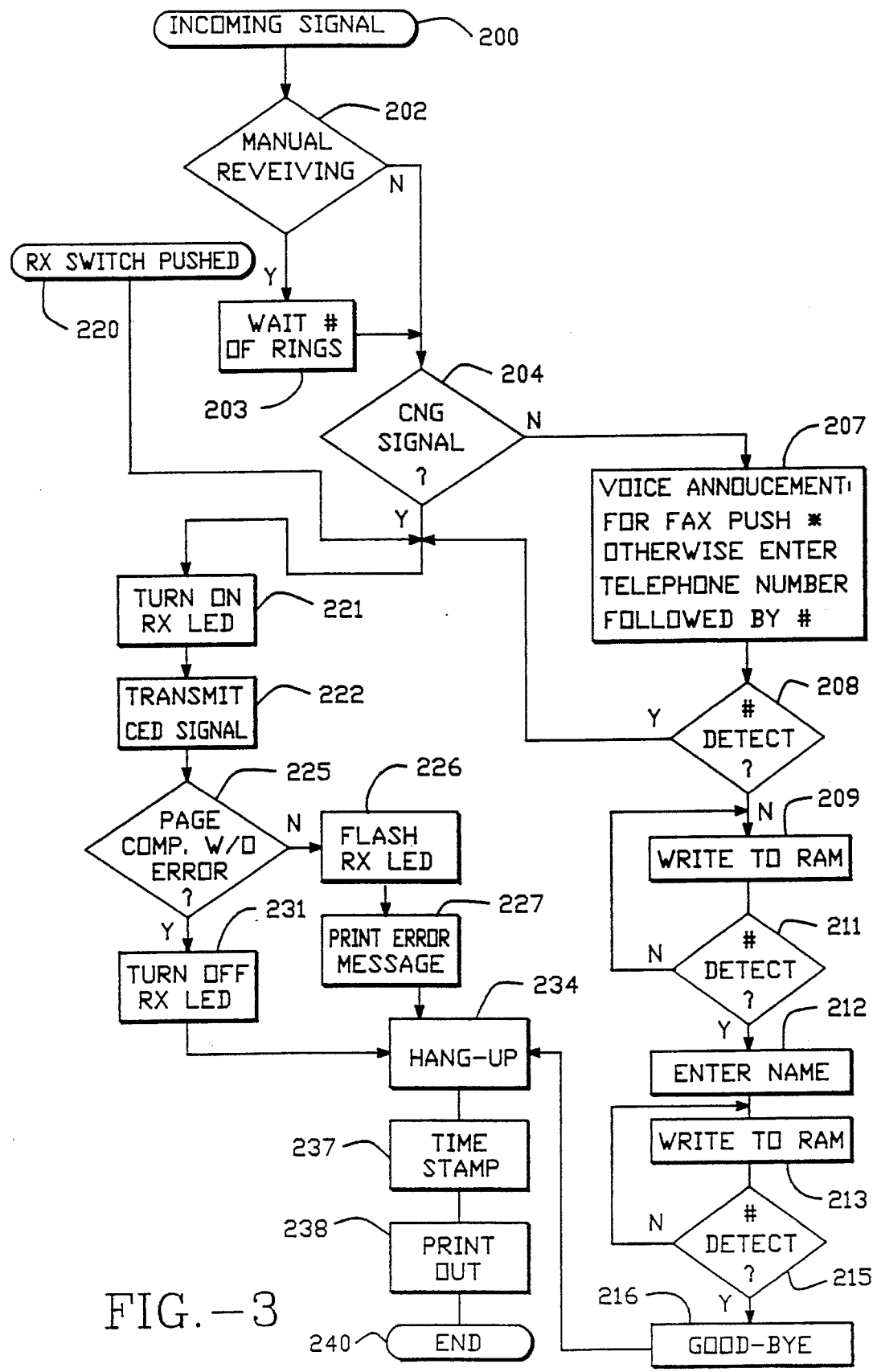
FIG. 3 is a flow chart of processing steps in a personal message device for responding to incoming data.

Referring to FIG. 3, a process flow chart is shown. The flow chart of FIG. 3 illustrates the process which transpires in the componentry of FIGS. 1 and 2, described above, during reception of an incoming signal which may be either a representation of a human voice, electronic data input from a caller's telephone keypad or the electronic image data of a facsimile transmission. With respect to facsimile transmissions, both outgoing and incoming, CCITT T.30 facsimile transmission standards are followed. These standards are well known and documented and, therefore, are not discussed in detail herein.

Input to the receiving process occurs at step 200 with the receipt of an incoming signal by the modem 120. Decision block 202 illustrates the capability of setting the PMD 100 for delayed (manual receiving) or automatic pick-up. Manual receiving means that a human has a threshold number of rings in which to manually answer the telephone before the PMD 100 automatically responds to the incoming signal. If manual receiving is set, the PMD 100 waits for the threshold number of rings, illustrated in step 203. If manual receiving is not set, the PMD 100, by way of the modem 120, begins immediate monitoring of the input signal to determine if a CNG signal is present. It should be recognized that even when manual receiving is set and a threshold number of rings has been established, the modem 120 is capable of monitoring the incoming signal automatically causing the PMD 100 to enter facsimile transmission reception mode when such a signal is connected.

At step 204 a decision is made as to whether a CNG signal is present, thus indicating an incoming facsimile transmission. If it is not present, the PMD 100 via modem 120 determines by default that the calling party must be a human. In this case, the processor 140 enables the voice generator 122 to output an outgoing announcement. The outgoing announcement will first ask the calling party if it intends to send a facsimile transmission, and if it does, to push the star (*) button. This permits a remote caller to place the PMD 100 in the facsimile transmission reception mode. Further in the outgoing message depicted at step 207, the calling party is asked to leave their telephone number by entering it from their own telephone keypad. They are instructed to type the pound (#) key when they are finished entering their telephone number.

In step 208 a determination is made as to whether the star key (*) has been depressed. If it has been depressed, the process flow is shifted over to the facsimile transmission reception process described below. If it has not been detected, a signal representative of the key depressed is written to RAM (step 209).

In step 211, a determination is made as to whether a first depression of the pound key (#) has occurred. If it has not occurred, the process flows back to step 209 and data representative of the depressed key is written to RAM 150. If, at step 211, a determination is made that the pound key (#) has been depressed, a subsequent voice announcement is generated, requesting a caller to enter their name using the letters designated on the keypad and to push the pound key (#) when complete (step 212). In step 213 this data is written to RAM 150. When the pound key (#) is detected in step 215 the process flows to step 216 where a parting salutation is generated and process flow continues to hang-up step 234. In the hang-up step 234, the telephonic connection is terminated. In steps 237 and 238 the data in RAM 150 is time stamped and printed out by device 168, respectively. At step 240, the process flow ends.

Referring to step 221, facsimile transmission reception mode commences by the turning on of the receive LED 109. The PMD 100 then generates and transmits a Called Station Identification (CED) signal which is a 2100 Hz tone. This signal is generated in response to the CNG signal.

Once the handshaking of the CNG and CED signals is complete, electronic image data is transmitted from the remote facsimile machine to the PMD 100. In step 225 a determination is made as to whether all of the pages of electronic image data have been received without an error. If the determination is negative, the receive LED 109 is caused to flash and then at step 227, an error message is printed out on the hard copy printer device 168. The process then proceeds to hang-up step 234 and continues as discussed above. If the determination at step 225 is positive, the receive LED 109 is turned off and process flows to the hang-up step 234. Thereafter a time-stamp is generated and printed out.

Referring to input step 220, facsimile transmission reception mode may be entered directly by pressing the facsimile reception switch 108 which causes the processes to flow directly from step 220 to step 221. The facsimile transmission reception is then carried out therefrom as described immediately above. This operation is used for manual facsimile receiving mode.

Note that at anytime during the process of FIG. 3, the receiving or transmitting party may hang-up. In this event, the process flows directly to the hang-up step 234 and onward from there as indicated.

Figure 4:
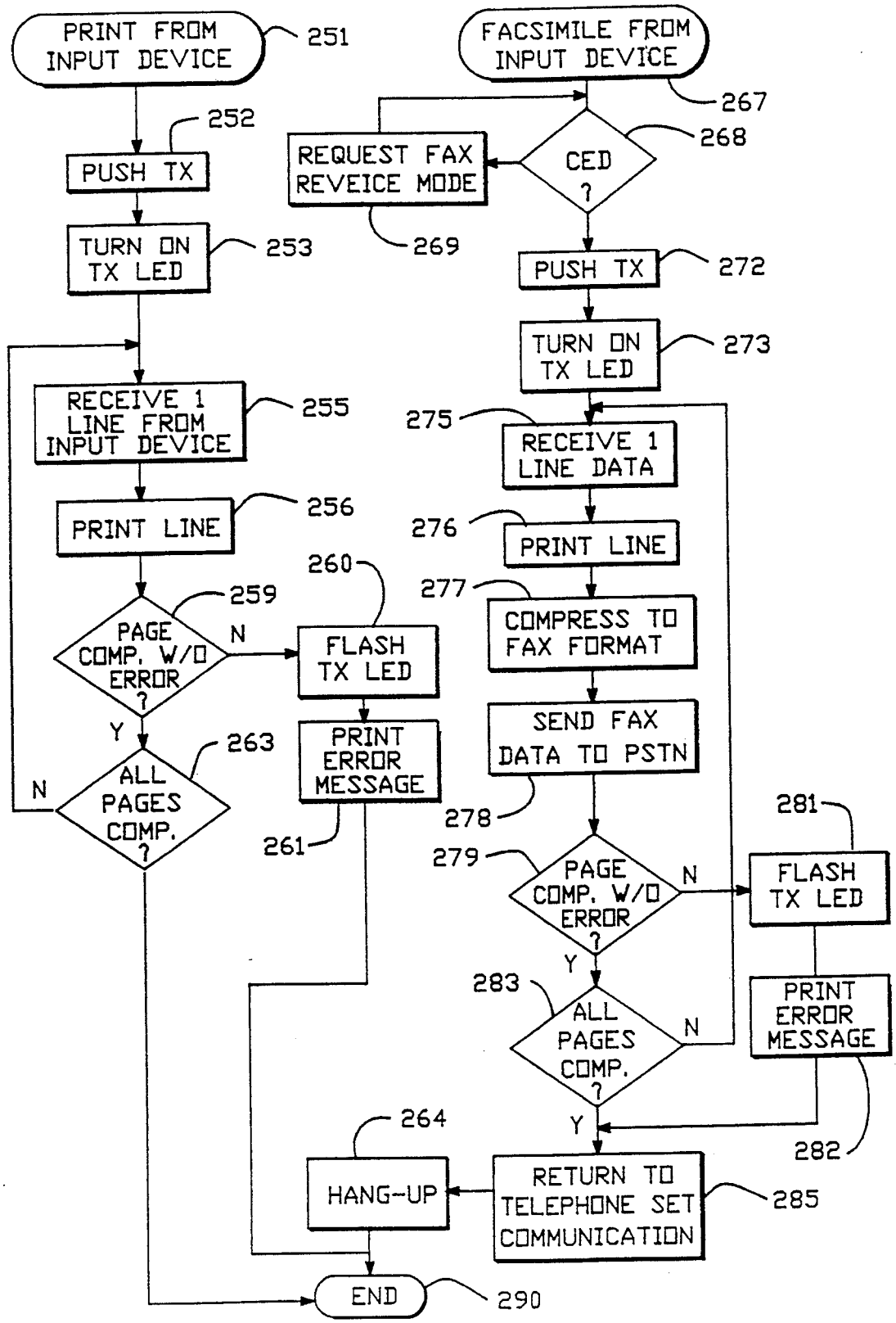
FIG. 4 is a flow chart of processing steps in a personal message device for transmitting outgoing data.

Referring to FIG. 4 is a process diagram for process flow within the PMD 100 during the transmission of data from an input device to the PMD 100 for print out and/or facsimile transmission.

There are essentially two processes which occur as a result of the receipt of data from an input device. These are (1) printing the input data on the hard copy printer 168 or (2) transmitting the input data as a facsimile transmission onto the telephone line 20 in addition to printing it at the hard copy printer device 168. In the process described herein, input data sought to be transmitted as facsimile transmission is also printed on printer 168. In an alternative embodiment, however, the input device can send a command to the PMD 100 to disable the printer 168 should a user desire to transmit input data as a facsimile transmission but not desire to have that data printed out. In a further alternative embodiment, the printer 168 may be disabled directly by the PMD 100.

Referring to step 251, to begin the process of printing out data from an input device, the transmit switch 111 of the PMD 100 is depressed while the telephone 25 is in an "on-hook" position. Depression of the transmit switch 111 at step 252 causes the transmit LED to be turned on at step 253. PMD 100 is then ready to receive a first line of input data from an input device. This occurs at step 255 pursuant to an interface protocol described below. At step 256, the first line of data transmitted from the input device is propagated either by a DMA channel 148 or under control of the processor 140 to the printer 168 where it is printed out. Though not strictly indicated by the process flow of FIG. 4, the process of receiving a line of input data from an input device is repeated as is the step of printing out the line of input data for all the lines of a page until end of data within a page is detected.

In step 259, a determination is made as to whether a complete page of input data has been transmitted and printed out without an error. If this determination is negative, the transmit LED is caused to flash, indicated by step 260, and in step 261 an error message is printed out. Process flow then continues to the process end step 290.

At step 263, a determination is made as to whether all of the pages of input data have been transmitted and printed out. If the answer is negative, the process loops back to receive the following line of input data at step 255. If the determination is affirmative, the process flows to end process step 290.

Referring now to the facsimile transmission portion of the transmission process which begins at step 267, a human must call the destination using telephone 25 and listen for a CED signal. At step 268, a determination is made as to whether a CED signal is present. For example, such a signal would be present if a facsimile machine was called. If the determination is negative, there are normally three options which the user may pursue. These occur in step 269. First, if the station being called is a machine which must manually be set in either telephone or facsimile mode, the caller can request the person at the receiving station to switch the receiving station to a facsimile mode. The caller must then hang up and redial and listen for the CED signal. This time, the remote station should answer the telephone in facsimile mode and generate the appropriate signal. Second, the remote station may have a personal message device such as that of FIG. 1. If a human answers the telephone, the caller will request that the receive switch 108 be depressed. This will cause the remote PMD 100 to generate the appropriate facsimile signal. Third, if the remote station is again a PMD 100, but no human operator is available to answer the telephone, the caller may depress the star key when requested to do so by the voice announcement to thereby switch the remote PMD 100 to facsimile transition receiving mode. Process flow then returns to step 268 for an affirmative determination of the CED signal.

When the CED signal has been received, the transmit switch 111 is depressed by an operator at step 272 in much the same manner as in step 252. In step 273, the transmit LED is illuminated. In step 275, one line of image data is received from the input device following the input device interface protocol and in step 276, that line of data is printed on the hard copy printer 168. Steps 273, 275 and 276 are analogous to steps 253, 255 and 256, respectively, described above.

In step 277, input data is compressed to facsimile data format by the compression circuitry 152 and in step 278, the data is transmitted to the modem 120 from where it is propagated through the DAA 114 onto telephone line 20 and thus onto the PSTN. As was the case with the print out only mode described with reference to steps 255 and 256, after one line of input data has been processed, the system process flow loops to receive the next line of input data until all lines for one page are complete or until an end of data signal is detected.

At step 279, a determination is made as to whether a page of input data has been successfully printed at printer 168 and transmitted as a facsimile transmission on line 20. If the determination is negative, the process flows to step 281 and step 282 which are analogous to steps 260 and 261, respectively, described above and to step 285 where telephone set communication is resumed.

If a determination at step 279 is affirmative, the process flows to step 283 where a determination is made as to whether all pages of input data have been successfully processed. If a determination at step 283 is negative, the process loops to receive the following line of input data for the next page. If the determination is affirmative, the process flows to step 285 where telephone set communication is resumed. Thereafter, the process flows to the hang-up step 264 and to end process 290.

Input Device Interface (IDI)

Figure 5:
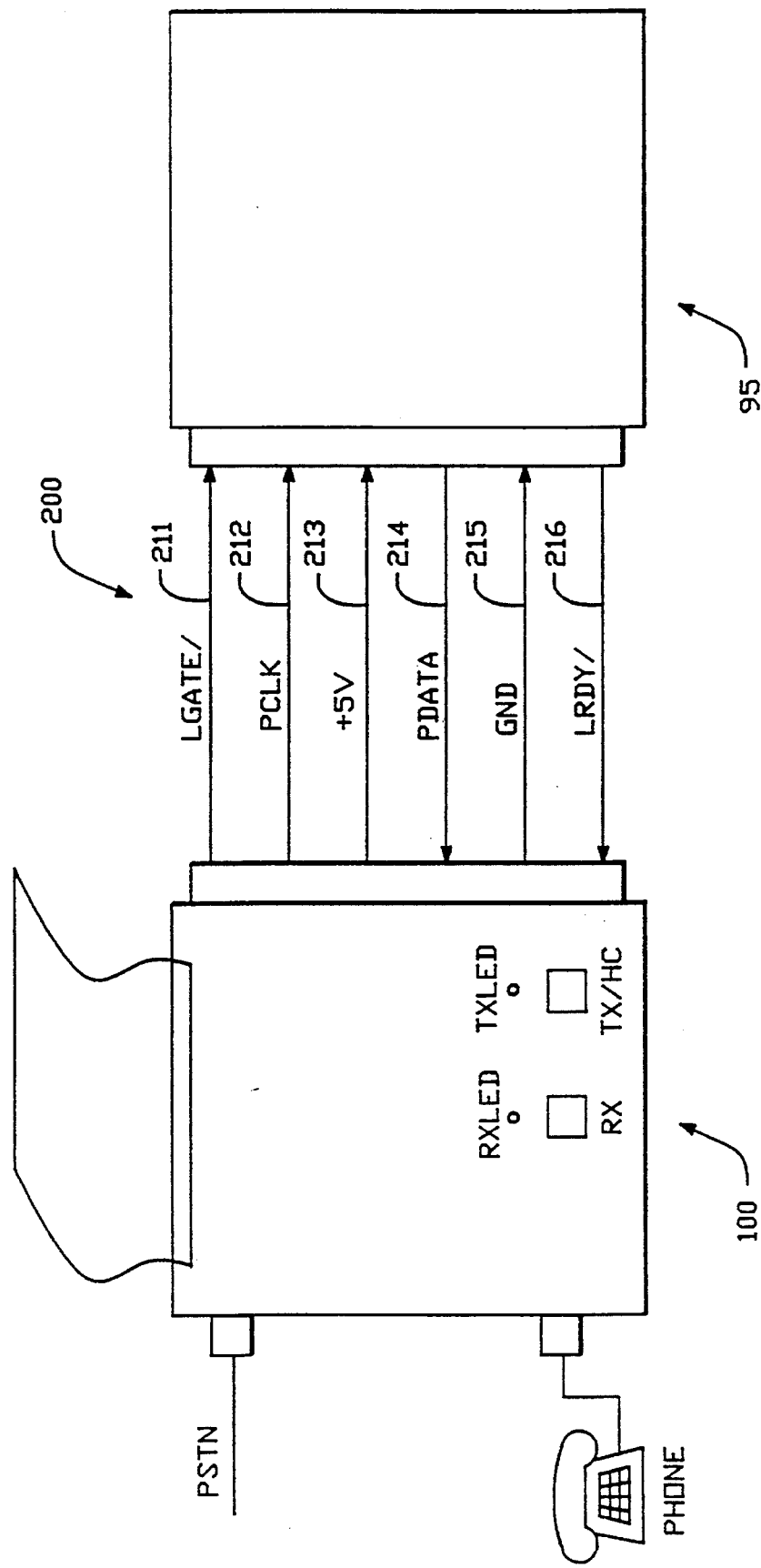
FIG. 5 is a diagram of an input device interface between a PMD and an input device.

Referring to FIG. 5, a diagram illustrating the interconnection between a PMD 100 and an input device 95 is shown. The input device interface (IDI) 200 consists of 6 signal lines for the transmission of black and white data and more for color data (see FIG. 12). These include a signal line for: LGATE/211; PCLK 212; power (+5 V) 213; PDATA 214; ground 215 and LRDY/ 216. The PMD 100 has a state machine (described below with reference to FIG. 8) which generates and is responsive to signals propagated on lines 211–216. To facilitate an understanding of the IDI 200, a brief discussion of the signals propagated on lines 211–216 is provided first, following by a block diagram of IDI hardware, which is in turn followed by a description of the state and timing diagrams.

The LGATE/signal is propagated on line 211 and is essentially an enable signal which is generated in response to an LRDY/signal from the input device 95. The LGATE/ signal is maintained low until a transfer of one line of data is complete. LGATE/is maintained low for a predetermined number of PCLK pulses; that predetermined number of pulses being equal to the number of bits of pixel data which form one line of image data.

The PCLK signal, like the LGATE/ signal, is propagated from the PMD 100 to an input device 95. The PCLK signal is provided to clock PDATA on line 214 to the PMD 100. Input data is latched on the positive edge of PCLK.

On line 213, a +5 V supply signal is transmitted from the PMD 100 to an input device 95 to drive the electronic circuitry thereof. The signal on line 213 is controlled by the state machine 250 and supplies power to the input device(s) when it is not in the disconnect state. This results in an efficient distribution of electrical energy to the input device 95.

Line 214 is the PDATA line. PDATA represents pixel data or "image data" (used interchangeably herein) to be printed out on the hard copy device 168 or transmitted as a facsimile transmission over line 20.

Line 215 is provided for the ground signal. A common ground is transmitted from the PMD 100 to the input device to provide a reference for the +5 V power supply and for the logic levels of LGATE/, LRDY/ and PDATA.

On line 216, the LRDY/signal is transmitted from an input device 95 to the PMD 100 when the input device 95 has a line of data ready for transmission to the PMD 100. The input device 95 then waits for the LGATE/ signal to be driven low by the PMD 100 in response to which it begins transmitting PDATA, preferably one bit per PLCK. Note that data transfers for facsimile transmissions is in conformance with CCITT T.4 standards and recommendations, particularly those applicable to Group 3 apparatus which enables an ISO A4 document to be transmitted over a telephone-type circuit in approximately one minute. Thus, 1,728 pixels are transferred for one scan line of data having a standard scan line length of 215 mm ±1%.

Figure 6:
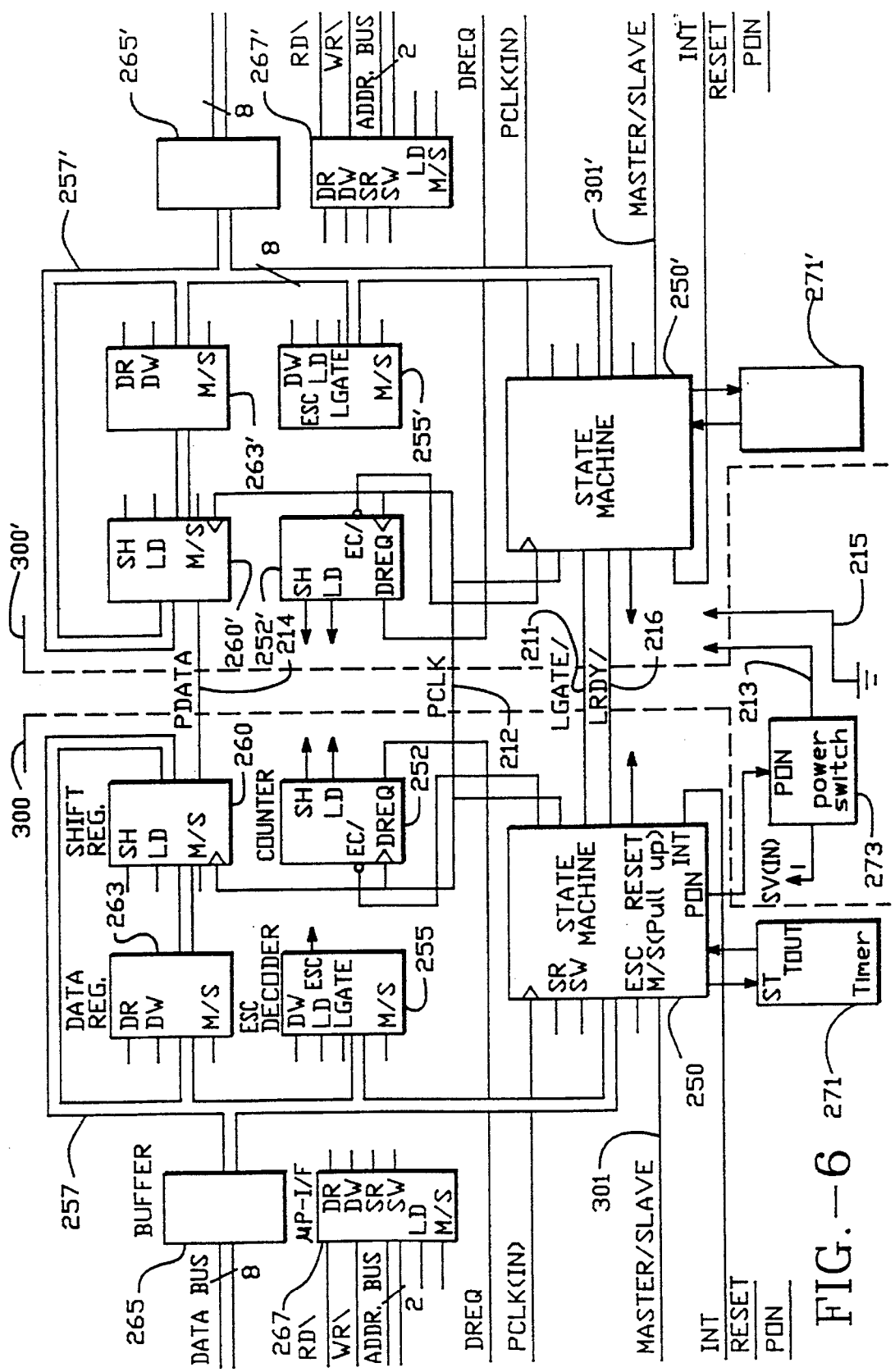
FIG. 6 is a block diagram of circuitry for implementing an input device interface.
Figure 7:
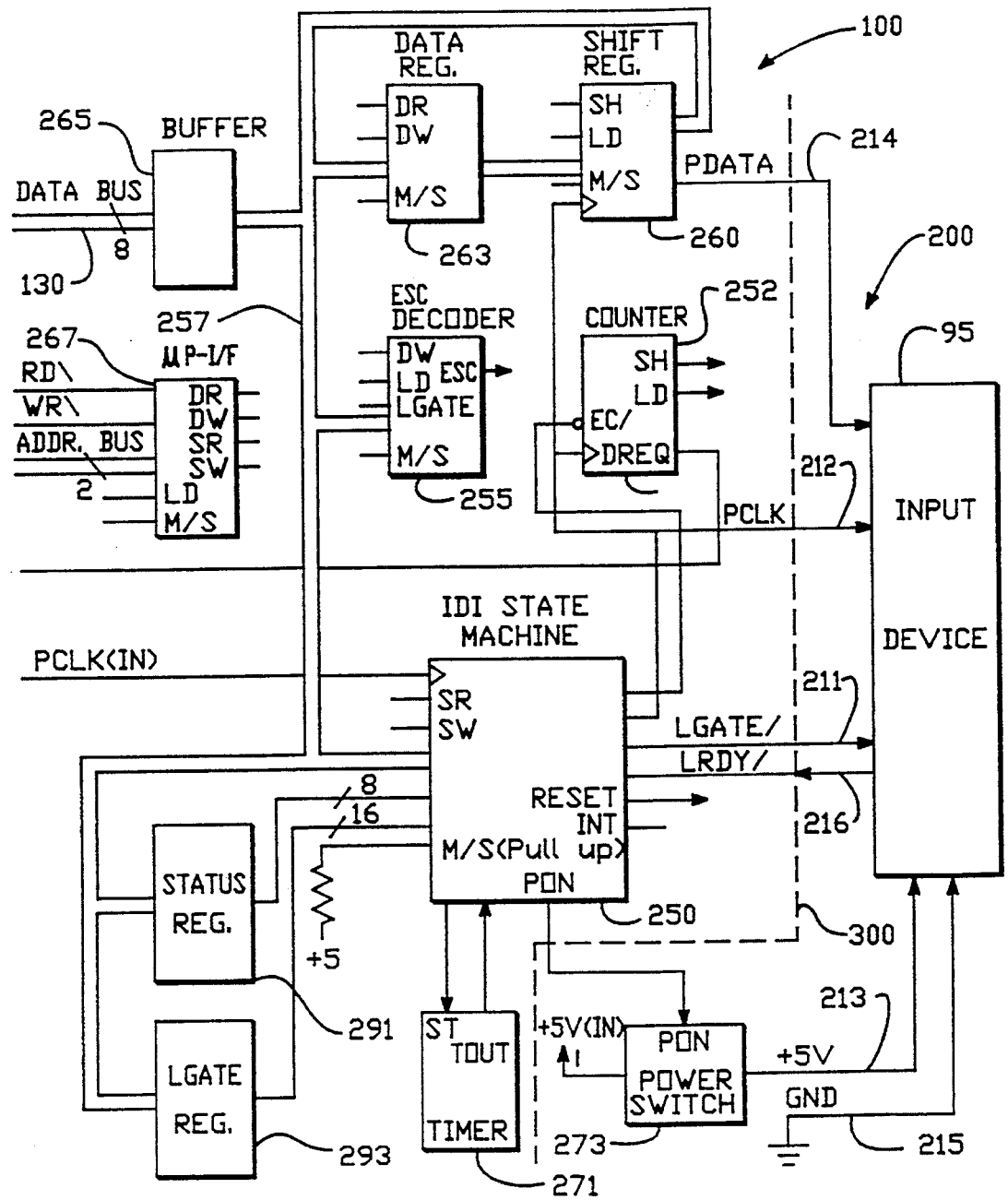
FIG. 7 is a block diagram of input device interface circuitry within a PMD.

Referring to FIG. 6, a block diagram of circuitry for implementing the IDI 200 is shown. To enhance the efficiency of manufacturing and to reduce costs, among other reasons, an identical integrated circuit (IC) is provided in both the PMD 100 and the input device 95. FIG. 6 presents a general overview of the interrelation of both integrated circuits 300 and 300' and FIG. 7 provides a more detailed description of the operation of the integrated circuit 300 in the PMD 100. One difference in implementation between the two ICs is that the IC 300 in the PMD 100 is a master and, therefore, the master/slave line 301 is pulled high. In the input device 95 the master/slave line 301' is grounded. Although the circuitry described herein is provided in individual ICs 300 and 300' the necessary components, including shift registers and control circuitry could be provided in any of a number of alternating embodiments which are known in the art.

Each IC 300, 300' has control circuitry housed in a state machine 250, 250' that carries out a state diagram described below. Each state machine 250, 250' communicates through a buffer 265, 265' to a processor (not shown, but which is the processor 140 in the PMD 100). A plurality of register are provided in each IC 300, 300'. These include the data register 263, 263' and the parallel to serial or serial to parallel shift register 260, 260'. These registers are connected by an internal bus 257, 257' to a decoder 255, 255' as well as the buffer 265, 265' and the state machine 250, 250'. The registers are accessible by a control interface 267, 267'. A timer 271, 271' is connected to the state machine 250, 250'.

PDATA is transferred between the shift registers 260, 260'. PCLK is selected by the host (PMD) processor 140 and propagated to and through the PMD state machine 250 to the input device 95. LGATE/ and LRDY/ signals are propagated between the state machines 250, 250' as indicated. Power and ground are provided off of the ICs 300, 300', but the supply of power to the input device is controlled by the PMD state machine 250 as described herein.

Referring to FIG. 7, a block diagram of circuitry within the IC 300 of the PMD 100 is shown. This circuitry includes a state machine 250 which functions in accordance with the state diagram described below with reference to FIG. 8. The PMD 100 also contains a byte counter 252 which is clocked by PCLK and outputs a count of data bytes transferred over the PDATA line from an input device 95 to the PMD 100.

An escape decoder 255 is provided which decodes a string of ASCII escape commands which precedes command data. When an escape sequence is decoded a bit is set in the status register 291 which the state machine 250 responds to. The decoder 255 is connected to an internal data bus 257 which is also connected to the state machine 250, a shift register 260, a data register 263 and a data buffer 265. Input data transferred from an input device 95 is propagated to the shift register 260 which is a serial to parallel shift register, shifting out 8 bits in parallel. Image data transferred from an input device 95 is transferred from the shift register 260 to the data register 263 from which it is subsequently transferred through the data buffer 265 to RAM 150 under control of the DMA 148 operation. The data buffer 265 is connected between the local system bus 130, described above, and the internal data bus 257.

A status register 291 and a LGATE count register are also connected to the internal data bus 257. The status register 291 is eight bits in length and those bits are defined as follows:

| BIT | R/W | NAME | DEFINITION |
| --- | --- | --- | --- |
| 7 | R | STCODE2 | IDI State Code Bit 2 |
| 6 | R | STCODE1 | IDI State Code Bit 1 |

-continued

| BIT | R/W | NAME | DEFINITION |
|---|---|---|---|
| 5 | R | STCODE0 | IDI State Code Bit 0 |
| 4 | R | ESC | ESCAPE Command Line |
| 3 | R/W | ERROR | IDI operation Error happened |
| 2 | R/W | LGATE | Software Controlled LGATE/ Signal |
| 1 | R/W | LRDY | Software Controlled LRDY/ Signal |
| 0 | W | START | In Master Mode. Signal Starts IDI Operation |

Figure 8:
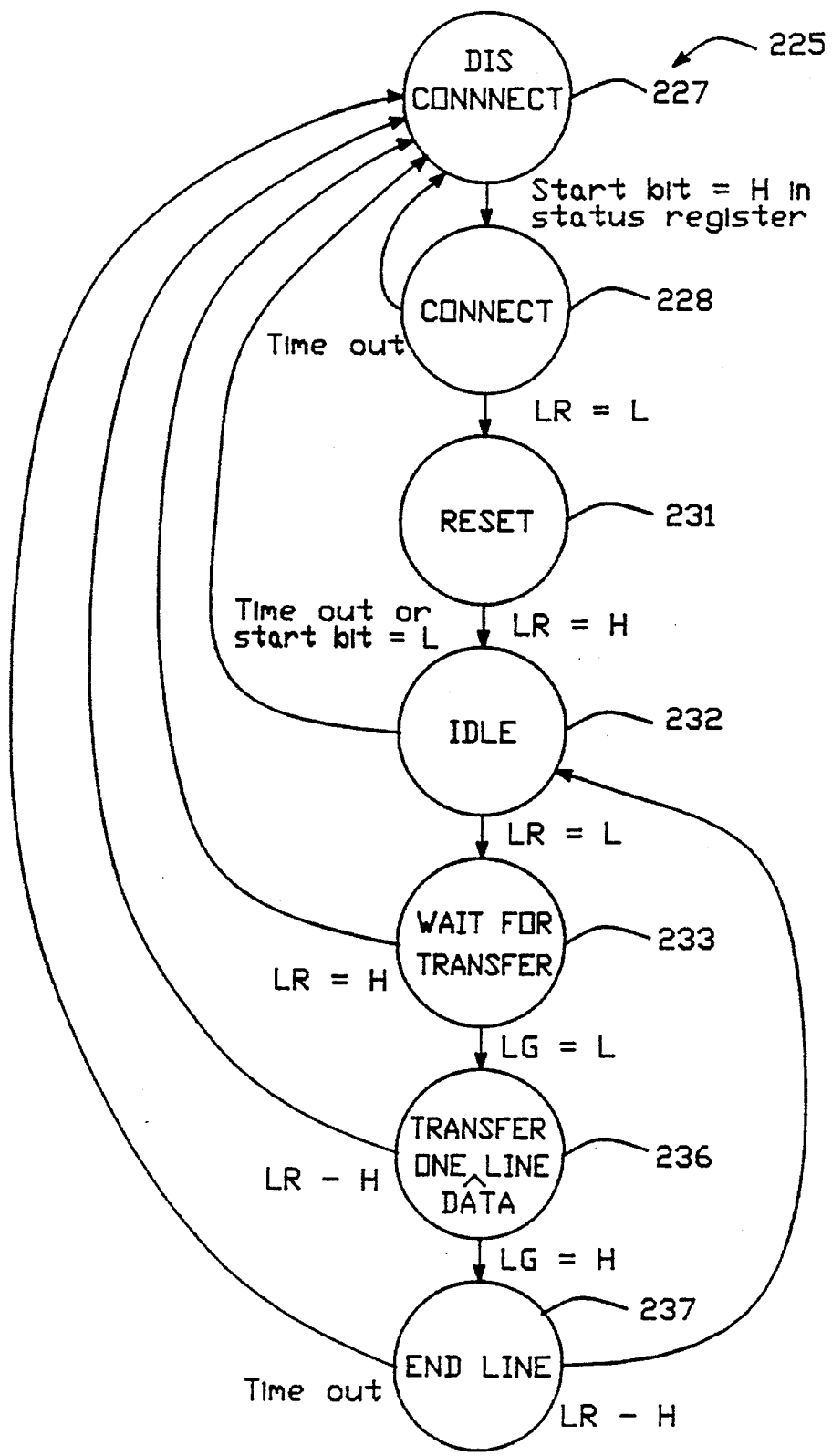
FIG. 8 is a state diagram of control flow in an input device interface.

Bits 7-5 indicate the present IDI state from among those illustrated in FIG. 8. Bit 4 is provided by the escape decode circuit 255. Bit 3 indicates that an error occurred during a data transfer. Bits 2 and 1 are the LGATE/ and LRDY/ signals, respectively, which may be written by the processor 141 or the control logic in the state machine 250. Bit O commences operation of the state machine described herein below. A microprocessor control interface 267 is provided which functions in some aspects as an address decoder for the loading and unloading of the shift register 260, status register 291 and LGATE count register 293 (which is 16 bits in length). The control interface 267 has two address lines and a read and write enable, all connected to the CPU 141.

A timer 271 is connected to the state machine 250 to provide a reference for time-out signals. A power supply switch 273 is provided for enabling power to an input device 95. The power switch 273 is controlled by the state machine 250.

Each input device 95 may be configured differently depending on the function that it is designed to perform. However, each input device has a shift register 260' (FIG. 6) which transfers data serially under the control of its state machine 250' and/or processor (not shown).

Data is transferred from the shift register 260' of an input device to the shift register 260 over line 214. PCLK is transmitted from the state machine 250 to the input device 95 over line 212. The LGATE/ signal is transferred over line 211 to the input device state machine 250'. The LRDY/ signal is transferred from state machine 250' to the state machine 250 over line 216 (See FIG. 6). Power and ground are transmitted from the PMD 100 to an input device 95 over lines 213 and 215, respectively.

Referring to FIG. 8, a state diagram illustrating operation within the state machine 250 is shown. The state diagram 225 has 7 states. These include: the disconnect state 227; the connect state 228; the reset state 231; the idle state 232; the wait for transfer ("wait") state 233; the transfer one data line ("transfer") state 236; and the end line ("end") state 237. Movement of control between these states is dependent upon the status of the signals on the LGATE/ signal line 211, the PCLK line 212, the PDATA line 214 and the LRDY/ line 216. The state diagram 225 will now be described in conjunction with the timing diagram for the IDI 200 shown in FIGS. 9-11.

During the disconnect state 227, the +5 V power supply on line 213 is not connected to the input device 95 and all of the signal lines 211-216 are tri-stated. Depression of the transmit switch 111 causes the start bit, bit O, in the status register 291 to go high which is turn causes the state machine 250 to change states to the connect state 228.

During the connect state, a +5 V signal is applied over line 213 to the input device 95. Additionally, the state machine 250 begins monitoring the LRDY/ signal on line 216 and a time-out count is started. If LRDY/ goes active (low) during the connect state, this indicates that an input device 95 exists and causes control to flow to the reset state 231. Otherwise, if a sufficient amount of time elapses without detection of an LRDY/ low signal, a time-out is declared and control is transferred to the disconnect state 227.

Referring to FIG. 9, the presence of LRDY/, LGATE/, PCLK and PDATA at logic high levels in the connect state is shown. The transition of LRDY/ from a logic high to low causes the reset state 231 to be entered. During reset state 231, PCLK signal is generated and transmitted over line 212 to the input device 95. Further in this state, LGATE/ is driven to toggle at a rate equal to half the frequency of PCLK. The toggling LGATE/ signal is provided to reset the input device. The transition of LRDY/ to a logic high completes the reset function and causes the state machine to transition to the idle state 232.

In the idle state 232, immediately following a reset state 231, LGATE/ is driven high and the IDI state machine 250 continues to monitor LRDY/. The PCLK signal is continually generated and the PDATA line is a don't care. When the LRDY/ signal on line 216 goes low, a valid line of image data is ready for transfer from the input device 95 to the PMD 100. This causes the state machine 250 to enter the wait state 233. If a logic low LRDY/ signal is not detected within a sufficient amount of time, a time-out is declared and control is transferred to the disconnect state 227. Further, if the start bit, bit O, in the status register 291 is driven low, control is transferred to the disconnect state.

During the wait state 233, the LGATE/ signal is driven low when the PMD 100 state machine is ready to except data from the input device 95. The state machine 250 also monitors LRDY/. If LRDY goes high, control is transferred to the disconnect state 227. When the LGATE/signal goes low, control is transferred from the wait state 233 to the transfer state 236. The duration of the wait state 233 is that period in which LRDY/ is low and LGATE is high following the idle state. This is shown in FIG. 9.

During the transfer state 236, image data is transferred between the input device 95 and the PMD 100. When the state machine 250 completes the reception of data from the input device 95, LGATE/ is driven high. It should be appreciated that data transmitted from the input device 95 may be either image data or a command, as discussed herein below. During the transfer state 236, the IDI state machine 250 continues to monitor LRDY/. If LRDY/ goes high during the transfer state, this indicates that there is some type of problems in the input device 95 and control is transferred from the transfer state 236 to the disconnect state 227.

To illustrate operation of the IDI 200 during the transfer state, an example of data transfer for a facsimile transmission is presented. In such a transfer, LGATE/ is held low for 1728 cycles of PCLK so that 1728 bits of pixel data may be transferred from the input device 95 to the PMD 100. As mentioned above, the 1728 bits per line is one of a plurality a facsimile standards and it is important to recognize that in alternative embodiments of the present invention the number of data bits per line may vary. The driving of LGATE/ high during the transfer state 236 is performed by the state machine 250 in response to a predefined count, such as the 1728 count for a 215 mm line facsimile transmission described here, which is loaded by the CPU 141 into the LGATE count register 293. When LGATE/ is driven high, control transfers to the end state 237.

During the end state 237, a decoding of an 8 bit command word transmitted during a command line is commenced, if the data transferred is in fact command data. The determination of whether information input from the input device 95 is command data is made by the escape decoder 255 of FIG.

7 as discussed above. The amount of time to decode a command byte is sufficiently long, under normal operation, that control has shifted to the idle state 232 (LR=H) by the time the command byte is decoded. If an EOT is decoded, the start bit is set low causing control to flow from the idle state to the disconnect state 227.

Further in the end state 237, the LRDY/ signal is monitored. When the LRDY/ signal goes high, the input device 95 has finished transferring data and control is transferred to the idle state 232. If the LRDY/ signal continues low for a predefined period of time after LGATE goes high a time-out is declared and control flows to the disconnect state 227.

Referring to FIG. 10, a timing diagram for an isolated transfer of one line of image date is shown. Transfers of image data proceed essentially as described above and as illustrated in FIG. 10.

Referring to FIG. 11, a timing diagram for transmission of command data is shown. The transfer of command data is similar to that of image data, however, the data bits which would normally comprise image data comprise a repeating pattern of 1 B hex which is the ASCII symbol for "escape." For example, the pattern 1 B hex would be repeated to completely fill the 1728 bits of data transferred for a facsimile transmission. The escape decode 255 decodes the repeating 1 B hex sequence and sets a bit in the status register 291 indicating that command data is being transmitted.

After a count of 1728 PCLK cycles, LGATE/ is driven high as was the case in the transmission of image data, for example, as in FIG. 9. In this instance, however, the state machine 250 will have detected the repeating 1 B hex sequence and will monitor the next 8 bits transferred after LGATE/ is driven high. During the next 8 PCLK cycles, 8 bits of command data, equal to a command byte, having a leading least significant bit and in an ASCII format, are transmitted. LRDY/ remains low for these 8 cycles of PCLK and then goes high after the transmission of the last or most significant bit of the command byte.

Color Implementation

Figure 12:
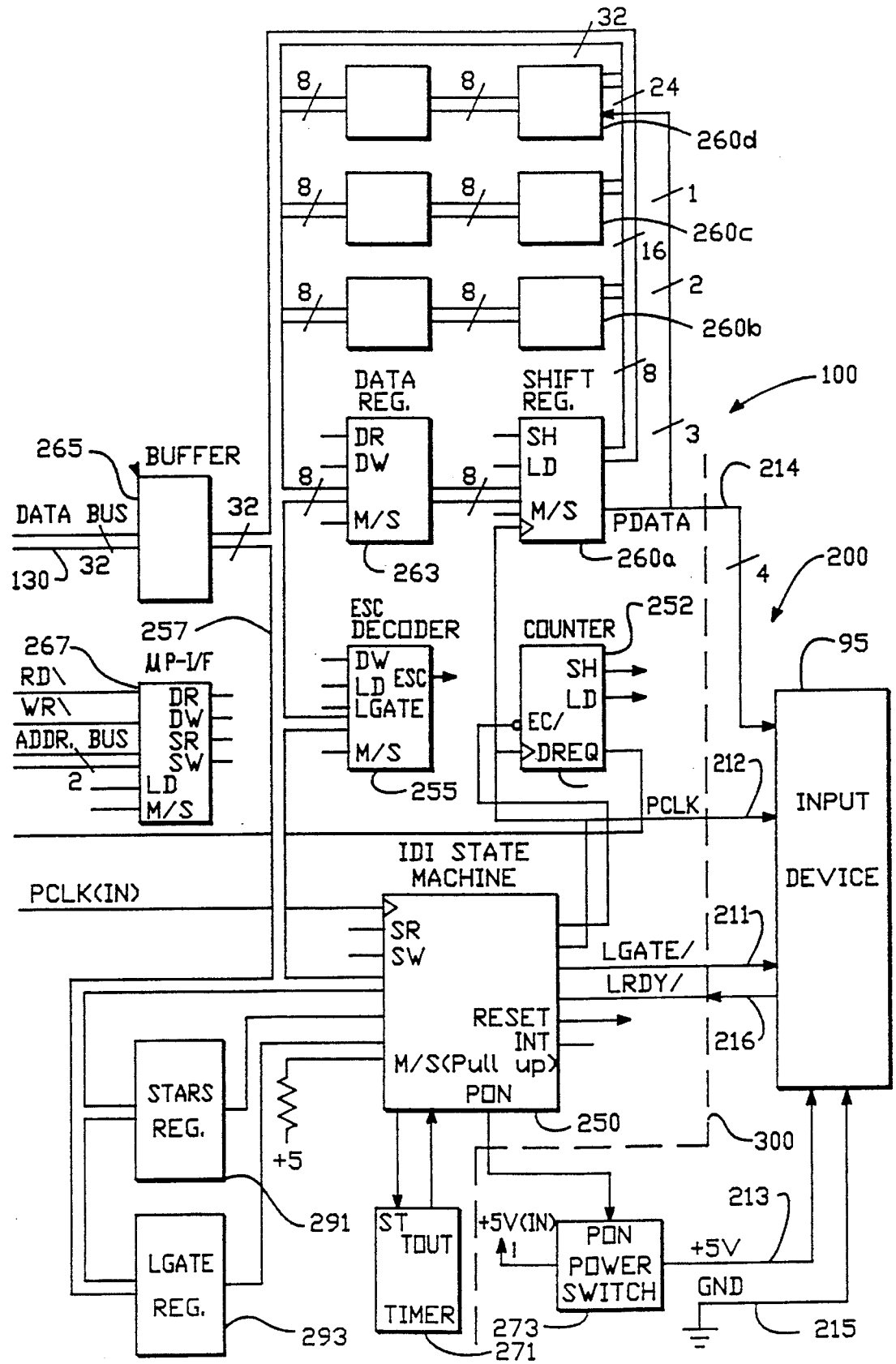
FIG. 12 is a block diagram of input device interface circuitry in a PMD for color data transfers.

Referring to FIG. 12, a modification of the block diagram of FIG. 7 is shown. The embodiment of FIG. 7 is for the transmission of black and white images. The embodiment of FIG. 12 is for the transmission of color images.

To accommodate color images the PDATA line 214 is 4 bits wide, 1 bit for each of the colors: black, cyan, yellow, and magenta. Data on each of these four lines is input to one of four shift registers 260 a–d. These registers 260 a–d function in a manner analogous to register 260 of FIG. 7. The internal data bus 257 is 32 bits wide to accommodate the transmission of eight bits of data transmission to and from each of the 4 shift registers 260 a–d and data registers 263 a–d. Transfers between the internal bus 257 and the PMD local bus 130 are performed as 32 bit transfers through buffer 265.

Separate shift and data registers for each color are provided to ensure synchronous operation. The control interface 267, status register 291 and LGATE register 293 are unaffected by the inclusion of color data transfer circuitry.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. An interface between a host and an input device, comprising:

a plurality of signal lines for connecting the input device to the host, including a power supply line, a data transmission line, a control signal transmitting line and a control signal receiving line;

power supply in communication with said power supply line for supplying power over said power supply line to the input device;

a data transmission channel coupled to said data transmission line for receiving data from the input device and for transferring the received data to the host; and control logic coupled to the host and said power supply for enabling the supply of power over said power supply line to the input device from time to time, and monitoring said control signal receiving line to maintain the supply of power until a time out occurs, or until a data transfer on said data transmission channel ends.

2. The apparatus of claim 1, further comprises:

switch circuit coupled to a switch mounted externally to the host and to said control logic;

wherein said control logic is responsive to activation of said switch to connect power to said power supply line.

3. The interface apparatus of claim 1, wherein said control logic includes:

logic coupled to said control signal receiving line for monitoring said control signal receiving line to determine if an acknowledge signal is provided within a predefined time period by the input device in response to the supply of power to the input device over said power supply line which indicates a data transfer to be executed on said data transmission channel.

4. The apparatus of claim 3, further comprising:

switch circuit coupled to a switch mounted external to the host and to said control logic;

wherein said control logic is responsive to activation of said switch to connect power to said power supply line.

5. The apparatus of claim 4, wherein said control logic disables power supply to the power supply line if an acknowledge signal is not received over said control signal receiving line within a predefined time period.

6. An interface apparatus for connecting an input device to a host, comprising:

a plurality of signal lines for connecting the input device to the host, including a power supply line, a control signal transmitting line, a control signal receiving line, a data receiving line and a clock line;

control logic coupled to said plurality of signal lines for controlling the propagation of signals thereon;

a state machine for driving operation of said control logic, said state machine including:

a first state in which power on said power supply line is disabled;

a second state, entered from time to time from the first state, in which power on said power supply line is enabled and said control signal receiving line is monitored for a signal indicating a presence of an input device, wherein control is transferred from said second state to said first state when said signal indicating the presence of an input device is not received within a predefined time period;

a third state, entered into if the presence of an input device is indicated in the second state, in which a clock signal is generated on said clock line and a reset signal is propagated on said control signal transmitting line to the input device;

a fourth state, entered into in response to a signal on said control signal receiving line indicating reset of the input device is complete, in which a host idle signal is transmitted on said control signal transmitting line and said control signal receiving line is monitored for an indication that a line of data is ready in the input device for transfer to the host;

a fifth state, entered into when a line of data from the input device is ready for transfer, in which a signal enabling transfer is propagated over said control signal transmitting line;

a sixth state, entered into upon propagation of said transfer enabling signal, in which data is received over said data receiving line from the input device; and a seventh state entered into upon completion of said data transfer or interruption thereof, in which control is transferred to said fifth state if a signal on said control signal receiving line indicates that another line of data is ready for transfer from the input device and further in which control is transferred to said first state upon the occurrence of certain predefined conditions.

7. The apparatus of claim 6, wherein control is transferred from said fourth state to said first state when said signal indicating that a line of data is ready for transfer from the input device is not received with a predefined time period.

8. The apparatus of claim 6, wherein control is transferred from said fifth state to said first state if said signal indicating a line of data is ready for transfer is removed from said control signal receiving line.

9. The apparatus of claim 6, wherein control is transferred from said sixth state to said first state when a signal is detected on said control signal receiving line indicating an interruption in transmission of a line of data from the input device.

10. The apparatus of claim 6, wherein control is transferred from said seventh state to said first state when said control logic detects an end of transfer command sent by the input device from which data is being transferred.

11. The apparatus of claim 6, wherein the control logic includes:

logic coupled to said control signal transmitting line and said control signal receiving line that monitors during the fourth state, said control signal receiving line for a signal which indicates that a line of data is ready for transmission from the input device and enables said transmission in response thereto by propagating a send data signal on said control signal transmitting line;

said control logic during said seventh state enters a wait state in which said control signal receiving line is monitored for a signal indicating that a next line of data is ready for transfer from the input device and enables said transmission of said next line of data in response thereto by propagating a send data signal on said control signal transmitting line;

whereby entrance of said wait state during said seventh state permits the transfer of data between an input device that operates at a slower frequency than the host to which data is transferred.

12. An interface apparatus for connecting an input device to a host, comprising:

a plurality of signal lines for connecting the input device to the host, including a control signal transmitting line, a control signal receiving line, a data line, and a clock line;

a data transmission channel coupled to said data line for receiving both image data, in data lines of predetermined length, and command data from the input device and for transmission of said image data to the host;

control logic for controlling propagation of signals on said plurality of signal lines;

command logic coupled to said control logic that monitors a line of data transmitted on said data line to detect a predefined sequence of bits equal in length to said predetermined length and which indicates that command data follows said predefined sequence, and when said predefined sequence is detected to detect the command data following the predefined sequence.

13. The apparatus of claim 12, comprising:

modifying logic for modifying the predefined length of said line of data, thereby modifying the number of cycles of said data clock required to transfer one line of data.

14. The apparatus of claim 12, comprising:

serial to parallel shift register that receives data on said data transfer channel from an input device; and internal data bus in communication with said shift register and adapted for communication with a local system bus of the host, said internal data bus propagating data from said shift register to the host and to said shift register from the host;

wherein said data transfer channel has a plurality of serial data lines coupled to said shift register for propagating color data.

15. The apparatus of claim 14, wherein said data transfer channel includes a black signal line, a cyan signal line, a yellow signal line and a magenta signal line.

16. The apparatus of claim 14, further comprises:

a status register, in communication with control logic and adapted to be accessible by the host over said internal data bus, that indicates a status of data transfers from the input device to said shift register.

17. The apparatus of claim 16, wherein the toggling of a bit in said status register by the host causes said control logic to initiate a data transfer from the input device.

18. The apparatus of claim 14, further comprising:

logic that detects command data propagated over said data transfer channel from the input device.

* * * * *